2,734,093

ISOMERIZATION OF DECALIN

Abraham Schneider, Philadelphia, and William K. Conn, Springfield, Pa., assignors to Sun Oil Company, Philadelphia, Pa., a corporation of New Jersey No Drawing. Application October 1, 1952, Serial No. 312,657

6 Claims. (Cl. 260—666)

This invention relates to the isomerization of decalin and is specifically directed to the isomerization of decalin in the presence of a specific catalyst under selected mild conditions of operation.

Decahydronaphthalene, commonly known as "decalin," usually exists in the form of cis-decalin, trans-decalin or mixtures thereof, both forms being relatively stable. Decalin is obtained from hydrocarbon oils, by the hydrogenation of naphthalene, and from coal tar distillations. Depending on the source, decalin may be principally the cis- or trans- form, or a mixture thereof.

Decalin has many uses, such as a substitute for turpentine in the paint and varnish industry, in the manufacture of cosmetics, as a solvent in processing fats and oils, and the like. In compounding various products wherein decalin has been employed, e. g. as a solvent, it is frequently necessary to employ distillation or evaporation to remove the decalin. In this event it is advantageous to employ an isomer of decalin having substantially the same solvent powers as decalin, but a lower boiling point.

Isodecalins and their formation by the isomerization of decalins have heretofore been described. Isodecalins are bicyclic isomers of decalin having fused rings, at least 1 ring being composed of 5 carbon atoms. Isodecalins thus have two rings, and may have one ring composed of 6 carbon atoms and one of 5 carbon atoms, or both rings may contain 5 carbon atoms, in both cases the two rings having two carbon atoms in common. Isodecalins have lower boiling points than decalins, the boiling points being from 155° C. to 185° C. and from 185° C. to 194° C., respectively, and hence have advantages as above described. A further advantage is that, when used as the solvent for varnishes and lacquers, the isodecalins form quicker drying compositions due to their increased volatility.

Processes heretofore described for isomerizing decalin to isodecalins are not commercially feasible since considerable degradation of decalins to gas and lower molecular weight compounds is observed. For example, heretofore described processes for isomerizing decalin to isodecalins produce a substantial quantity of gas, olefins, paraffins, monocycloparaffins and aromatics.

It is accordingly an object of the present invention to provide a process for the isomerization of decalin to isodecalins. Other objects appear hereinafter.

It has now been found that by contacting in liquid phase a mixture of decalin and an isoparaffin with a catalyst comprising hydrogen fluoride and boron trifluoride at a temperature of from 125° C. to 250° C., the decalin is rapidly converted to isodecalins without the formation of substantial quantities of other materials. It has been found that a quantitative recovery of the isoparaffin employed is obtained.

To illustrate an embodiment of the present invention, decalin and an isoparaffin, such as isobutane, is agitated in liquid phase with a mixture of hydrogen fluoride and boron trifluoride at a temperature of from 125° C. to 250° C. for from about 10 minutes to 5 hours. The acid layer is separated from the hydrocarbon layer, such as by decanting. Isodecalins, because of their relatively low boiling points, are readily separated from the reaction mixture by distillation. Isobutane and unconverted decalin are advantageously recycled to the process.

The decalin employed in the process of the present invention may be from any source, and may be cis-decalin, trans-decalin, or mixtures thereof in any ratio.

The presence of an isoparaffin is not essential to achieve a yield of isodecalins, but is necessary in order to obtain yields in commercial quantities. Isobutane is the preferred isoparaffin to employ. Other isoparaffins which may be used include those which have a tertiary hydrogen atom, i. e., those paraffins which have a hydrogen atom attached to a tertiary carbon atom, such as 2-methyl butane; 2,3-dimethyl butane; 2-methyl hexane; 3-methyl hexane; 2,3-dimethyl hexane; and homologues and mixtures thereof. The isoparaffin employed should not have a boiling point which will interfere with the separation of the other components of the reaction mixture.

The temperature to employ must be maintained within the range of from 125° C. to 250° C., the optimum range being from 150° C. to 160° C. At lower temperatures substantial reaction is not observed, whereas at higher temperatures degradation of decalin with rupture of the rings is observed. The quantity of hydrogen fluoride to employ may be varied from 50 to 600 weight percent based on the quantity of decalin, and about 5 to 50 weight percent of $BF_3$, based on the amount of hydrogen fluoride employed, is required. The amount of isoparaffin is advantageously maintained within the range of 25 to 1000 weight percent, based on the amount of decalin employed. With smaller amounts, degradation of the products is observed and no advantage is observed by going to higher quantities. The present process is carried out in liquid phase and the pressure employed is that which is advantageously employed to maintain liquid phase reaction. Under the preferred conditions of operation the pressure will be from 100 to 1500 p. s. i. g. The time required for the conversion is not critical and will depend upon the other conditions employed. In general, the time required will usually be from 10 minutes to 5 hours.

The following example illustrates the process of the present invention in which "parts" refers to parts by weight based on the charge materials:

Into a reaction vessel were introduced 100 parts isobutane, 212 parts hydrogen fluoride, 62 parts of decalin and 24.1 parts of boron trifluoride. The mixture was stirred at a temperature of from 150° C. to 160° C. for 2.75 hours. The reaction mixture was then cooled and the hydrogen fluoride layer separated by decanting.

The recovered hydrocarbon layer, 154 parts, was separated into its components by distillation. There were recovered 94 parts of isobutane, a small amount being lost in transferring the reaction mixture. There were also recovered 14.4 parts of isodecalins boiling in the range of from 155° C. to 185° C. and having a refractive index $n_D^{20}=1.4506$ to 1.4605. The remainder of the hydrocarbon layer consisted of unconverted decalin.

No gas, i. e., hydrocarbons boiling below isobutane, olefins, monocycloparaffins or aromatics were formed in the process. Hydrogen fluoride recovery was practically quantitative, and the recovered catalyst was not contaminated so that it could be recycled to the process without purification or regeneration. Provision may also be made for recovery and reuse of boron trifluoride.

The process of the present invention has been described in terms of isomerizing decalin to isodecalins. Other hydrocarbons which are decalins, i. e., which have a decalin structure may be employed. By "decalin structure," as used herein, is meant a saturated bicyclic hydrocarbon wherein the rings are fused, each ring containing 6 carbon atoms. Such decalins have alkyl substituents attached to ring carbon atoms, such as 2-methyl decalin and 2,6-dimethyl decalin. In a broad embodiment, therefore, the invention provides a process for converting a decalin to isodecalins.

Aromatic hydrocarbons may be present in the reaction mixture without causing deleterious effects, and up to about 20% by weight, based on the decalin, can be present. Olefins, however, should not be present in concentrations greater than 5%, and preferably not greater than 1%, by weight of the decalin employed.

The invention claimed is:

1. Process of producing isodecalins which comprises forming a liquid phase reaction mixture consisting essentially of decalin, an isoparaffin, hydrogen fluoride and boron trifluoride, heating said reaction mixture to a temperature of from 125° C. to 250° C. to convert a substantial portion of said decalin to isodecalins having a boiling range below that of said decalin, separating said isodecalins from the reaction mixture and substantially quantitatively recovering said isoparaffin from the reaction mixture.

2. Process according to claim 1 wherein said isoparaffin is isobutane.

3. Process according to claim 1 wherein said isoparaffin is 2-methyl butane.

4. Process according to claim 1 wherein said isoparaffin is 2,3-dimethyl butane.

5. Process according to claim 1 wherein said isoparaffin is an isoheptane.

6. Process according to claim 1 wherein said isoparaffin is an iso-octane.

References Cited in the file of this patent

UNITED STATES PATENTS

| | | |
|---|---|---|
| 2,405,993 | Burk | Aug. 20, 1946 |
| 2,423,045 | Passino | June 24, 1947 |
| 2,428,923 | Thomas et al. | Oct. 14, 1947 |
| 2,629,754 | Condon | Feb. 24, 1953 |
| 2,632,777 | Pines | Mar. 24, 1953 |

OTHER REFERENCES

"Hydrocarbons from Petroleum," Rossini et al., Reinhold Pub. Co., New York (1953), pages 402 to 405 and 409.